United States Patent
Zhong et al.

(10) Patent No.: US 10,965,414 B2
(45) Date of Patent: Mar. 30, 2021

(54) SIGNAL CONFIGURATION METHOD, DEVICE AND STORAGE MEDIUM

(71) Applicants: China Mobile Communication LTD., Research Institute, Beijing (CN); China Mobile Communications Group Co., Ltd., Beijing (CN)

(72) Inventors: Ke Zhong, Beijing (CN); Hui Tong, Beijing (CN)

(73) Assignees: China Mobile Communication Ltd., Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/475,852

(22) PCT Filed: Jan. 5, 2018

(86) PCT No.: PCT/CN2018/071570
§ 371 (c)(1),
(2) Date: Jul. 3, 2019

(87) PCT Pub. No.: WO2018/127132
PCT Pub. Date: Jul. 12, 2018

(65) Prior Publication Data
US 2019/0356437 A1  Nov. 21, 2019

(30) Foreign Application Priority Data
Jan. 5, 2017 (CN) .......................... 2017 1 0008062

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0003* (2013.01); *H04L 25/0224* (2013.01);
(Continued)

(58) Field of Classification Search
CPC ....... H04L 5/0048–0051; H04L 27/261–2613; H04W 72/04–042; H04W 72/1263–1273
See application file for complete search history.

(56) References Cited

U.S. PATENT DOCUMENTS

2014/0086085 A1   3/2014   Zheng et al.
2015/0271744 A1   9/2015   Liu et al.
(Continued)

FOREIGN PATENT DOCUMENTS

CN   101005340     7/2007
CN   101714897 A   5/2010
(Continued)

OTHER PUBLICATIONS

CATT: "Discussion on phase tracking RS for NR" 3GPP Draft; R1-1611382, 3rd Generation Partnership Project (3GPP), Mobile Competence Centre ; 650, Route Des Lucioles ; F-06921 Sophia-Antipolis Cedex ; France, vol. RAN WG1, No. Reno, USA; Nov. 14, 2016-Nov. 18, 2016, Nov. 13, 2016 (Nov. 13, 2016), XP051175363, Retrieved from Internet: URL:http://www.3gpp.org/ftp/Meetings_3GPP_SYNC/RAN1/Docs/ [retreived on Nov. 13, 2016] * Sections 1-2 *.

(Continued)

*Primary Examiner* — Pao Sinkantarakorn
(74) *Attorney, Agent, or Firm* — Price Heneveld LLP

(57) ABSTRACT

A signal configuration method, device and storage medium are provided. The method includes: acquiring at least one type of reference information, wherein the reference information is used to characterize a configuration status of a communication network; and configuring time domain and/or
(Continued)

or frequency domain resources for a phase-tracking reference signal based on the at least one type of reference information, and obtaining configuration information of the time domain and/or frequency domain resources for the phase-tracking reference signal, wherein the configuration information includes a density or a pattern corresponding to the time domain and/or frequency domain resources.

14 Claims, 2 Drawing Sheets

(51) Int. Cl.
    *H04L 25/02*     (2006.01)
    *H04L 27/26*     (2006.01)
    *H04W 72/04*     (2009.01)

(52) U.S. Cl.
    CPC ....... *H04L 27/2666* (2013.01); *H04W 72/042* (2013.01); *H04W 72/0413* (2013.01)

(56) References Cited

U.S. PATENT DOCUMENTS

2018/0077603 A1*  3/2018  John Wilson ......... H04L 5/0048
2019/0222385 A1*  7/2019  Hessler ................ H04L 5/0048

FOREIGN PATENT DOCUMENTS

| CN | 102780532 A | 11/2012 |
|---|---|---|
| WO | 2018062942 A1 | 4/2018 |
| WO | 2018064313 A1 | 4/2018 |

OTHER PUBLICATIONS

LG Electronics: "Reference Signal for Frequency offset and Phase Tracking", 3GPP Draft; R1-1611809, 3rd Generation Partnership Project (3GPP), Mobile Competence Centre ; 650, Route Des Lucioles ; F-06921 Sophia-Antipolis Cedex ; France, vol. RAN WG1, No. Reno, USA; Nov. 14, 2016-Nov. 18, 2016, Nov. 13, 2016 (Nov. 13, 2016), XP051175778, Retrieved from Internet: URL:http://www.3gpp.org/ftp/Meetings_3GPP_SYNC/RAN1/Docs/ [retreived on Nov. 13, 2016] * Sections 1-2 *.

Ericsson, On phase noise effects[online], 3GPP TSG RAN WG1 #87 RI /1611382, Internet <URL:http://www.3gpp.org/ftp/tsg_ran/WG1_RL1/TSGR1_87/Docs/R1 - 1611382. zip>, 2016 Nov. 18, 2015.

Ericsson, On phase tracknig in DFT-S-OFM waveform[online], 3GPP TSG RAN WG1 #87 RI /1612338, Internet <URL:http://www.3gpp.org/ftp/tsg_ran/WG1_RL1/TSGR1_87/Docs/R1 - 1612338. zip>, 2016 Nov. 18, 2015.

Ericsson, Design considerations for phase noise tracking rs(PTRS)[online], 3GPP TSG RAN WG1 #87 RI /1612333, Internet <URL:http://www.3gpp.org/ftp/tsg_ran/WG1_RL1/TSGR1_87/Docs/R1 - 1612333. zip>, 2016 Nov. 18, 2015.

CMCC, Phase Noise Reference Signal Design for High Frequency Systems[online], 3GPP TSG RAN WG1 #87 RI /1612186, Internet <URL:http://www.3gpp.org/ftp/tsg_ran/WG1_RL1/TSGR1_87/Docs/R1 - 1612186. zip>, Nov. 18, 2016.

Qualcomm Incorporated, Phase and Frequency Tracking Reference Signal Considerations[online], GPP TSG RAN WG1 #87 RI /1612054, Internet <URL:http://www.3gpp.org/ftp/tsg_ran/WG1_RL1/TSGR1_87/Docs/R1 - 1612054. zip>, Nov. 18, 2016.

* cited by examiner

US 10,965,414 B2

SIGNAL CONFIGURATION METHOD, DEVICE AND STORAGE MEDIUM

CROSS-REFERENCE TO RELATED APPLICATION

This application is a U.S. national phase application of a PCT Application No. PCT/CN2018/071570 filed on Jan. 5, 2018, which is filed based on a Chinese patent application No. 201710008062.0 filed on Jan. 5, 2017 and claims a priority of this Chinese patent application, the disclosure of which is incorporated herein by reference in its entirety.

TECHNICAL FIELD

The present disclosure relates to a resource management technology in the field of communication, and in particular relates to a method for configuring a signal, a device for configuring a signal and a storage medium.

BACKGROUND

A 5G (Fifth Generation) New Radio (NR) will support full frequency-band access covering both a low frequency band (less than 6 GHz) and a high frequency band (6 GHz to 100 GHz). The high frequency band has a serious problem of phase noise, which is caused by non-ideality of a local oscillator. Compared with a communication system utilizing the lower frequency band less than 6 GHz, a communication system utilizing the higher frequency band from 6 GHz to 100 GHz experiences a significant increase in the phase noise due to a substantial increase of the order of frequency multiplication of a reference clock source. The phase noise degrades a Signal Noise Ratio (SNR) or an Error Vector Magnitude (EVM) at a receiving end and leads to a lot of bit errors, thereby limiting directly a usage of high-order constellation modulation schemes and putting a serious impact on a system capacity.

At present, a phase-tracking reference signal is configured with fixed consecutive resources in a time domain and a fixed density in a frequency domain. Although the phase-tracking reference signal configured in this fixed manner exhibits excellent phase-tracking performance, an overhead of the reference signal is extensive due to consecution of the resources in the time domain and fixity of the density in the frequency domain, therefore leading to a poor spectrum efficiency.

SUMMARY

An objective of the present disclosure is to provide a method for configuring a signal, a device for configuring a signal and a storage medium, so as to solve the aforementioned problem in the related art.

In order to achieve the objective, the present disclosure provides a method for configuring a signal. The method includes acquiring at least one type of reference information, wherein the reference information is used to characterize a configuration status of a communication network; and configuring time domain and/or frequency domain resources for a phase-tracking reference signal based on the at least one type of reference information, and obtaining configuration information of the time domain and/or frequency domain resources for the phase-tracking reference signal, wherein the configuration information includes a density or a pattern corresponding to the time domain and/or frequency domain resources The present disclosure provides a device for configuring a signal. The device for configuring a signal includes: a reference information acquisition unit, configured to acquire at least one type of reference information, wherein the reference information is used to characterize a configuration status of a communication network; and a configuration unit, configured to configure time domain and/or frequency domain resources for a phase-tracking reference signal based on the at least one type of reference information, and obtain configuration information of the time domain and/or frequency domain resources for the phase-tracking reference signal, wherein the configuration information includes a density or a pattern corresponding to the time domain and/or frequency domain resources.

The present disclosure provides a device for configuring a signal. The device for configuring a signal includes: a processor, configured to acquire at least one type of reference information, wherein the reference information is used to characterize a configuration status of a communication network; and configure time domain and/or frequency domain resources for a phase-tracking reference signal based on the at least one type of reference information, and obtain configuration information of the time domain and/or frequency domain resources for the phase-tracking reference signal, wherein the configuration information comprises a density or a pattern corresponding to the time domain and/or frequency domain resources.

The present disclosure provides a device for configuring a signal. The device for configuring a signal includes a processor, and a storage configured to store a computer program executable by the processor, wherein the processor is configured to execute the computer program to implement steps of the above method.

The present disclosure provides a storage medium. The storage medium includes computer executable instructions stored on the storage medium, wherein when the computer executable instructions are executed, the steps of the above method are implemented.

The method for configuring a signal, the device for configuring a signal and the storage medium provided by the present disclosure configure time domain and/or frequency domain resources for the phase-tracking reference signal based on reference information, such that the problem that an excessive signal overhead resulting from an inflexible configuration for the phase-tracking reference signal is solved, thereby improving the frequency spectrum efficiency of the phase-tracking reference signal.

BRIEF DESCRIPTION OF THE DRAWINGS

FIG. 2-1 is a schematic structural diagram of a device for configuring a signal according to the embodiments of the present disclosure;

FIG. 2-2 is another schematic structural diagram of the device for configuring the signal according to the embodiments of the present disclosure;

DETAILED DESCRIPTION

The present disclosure will be described hereinafter in more details in conjunction with drawings and embodiments.

First Embodiment

Figure 1:
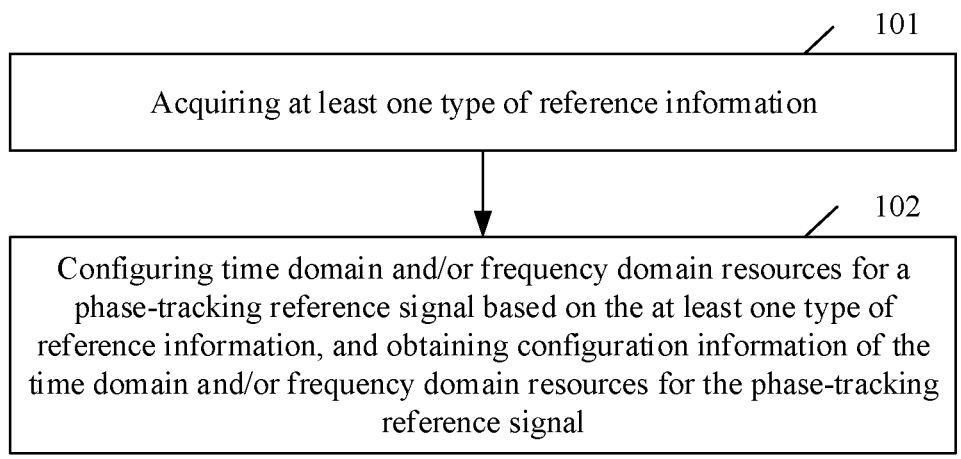
FIG. 1 is a schematic flowchart of a method for configuring a signal according to embodiments of the present disclosure.

The embodiment of the present disclosure provides a method for configuring a signal. As shown in FIG. 1, the method includes the following steps.

Step 101: acquiring at least one type of reference information, wherein the reference information is used to characterize a configuration status of a communication network.

Step 102: configuring time domain and/or frequency domain resources for a phase-tracking reference signal based on the at least one type of reference information, and obtaining configuration information of the time domain and/or frequency domain resources for the phase-tracking reference signal, wherein the configuration information includes a density or a pattern corresponding to the time domain and/or frequency domain resources.

Further, it is to be noted that the at least one type of reference information includes at least one of following: a phase-noise single-side-band power spectrum density, a modulation and coding scheme (MCS), a sub-carrier interval, an amount of time domain and/or frequency domain resource blocks to be scheduled, and a communication waveform.

In the embodiment, the phase-noise single-side-band power spectrum density may be obtained by using a phase noise model. It is certainly understood that the phase-noise single-side-band power spectrum density may be obtained by other means, and an exhaustive enumeration of the other means is omitted herein. The phase-noise single-side-band power spectrum density has a profile associated with a cost, a frequency band, a manufacturing process and a power consumption of the local oscillator, and a detailed description thereof is omitted herein.

The MCS refers to modulation and coding schemes, which is used to number various modulation and coding schemes, so that different communication schemes may be employed by the system. For example, a MCS index is used in 802.11 communication systems for configuring a wireless communication data rate to cope with different communication environments.

Correspondingly, the configuring the time domain and/or frequency domain resources for the phase-tracking reference signal based on the at least one type of reference information includes at least one of following steps: based on at least the phase-noise single-side-band power spectrum density corresponding to an increasing frequency offset, configuring the time domain and/or frequency domain resources for the phase-tracking reference signal; based on at least the MCS, configuring the time domain and/or frequency domain resources for the phase-tracking reference signal; based on at least the sub-carrier interval, configuring the time domain and/or frequency domain resources for the phase-tracking reference signal; based on at least the amount of time domain and/or frequency domain resource blocks to be scheduled, configuring the time domain and/or frequency domain resources for the phase-tracking reference signal; based on at least the communication waveform, configuring the time domain and/or frequency domain resources for the phase-tracking reference signal.

Specifically, if a decline rate of the phase-noise single-side-band power spectrum density increases with the frequency offset being increased, a density of the time domain and/or frequency domain resources for the phase-tracking reference signal is configured to be in a first density threshold range; and if the decline rate of the phase-noise single-side-band power spectrum density decreases with the frequency offset being increased, the density of the time domain and/or frequency domain resources for the phase-tracking reference signal is configured to be in a second density threshold range; wherein values in the first density threshold range are less than values in the second density threshold range; density threshold subsets that may or may not overlap with each other are included in the first density threshold range or the second density threshold range.

In other words, there is a relationship between the phase noise model and configuration of the time domain and/or frequency domain resources for the phase-tracking reference signal: the lower the decline rate of the phase-noise single-side-band power spectrum density with the frequency offset being increased is, the higher density of the time domain and/or frequency domain resources for the phase-tracking reference signal is required; and the faster the decline rate of the phase-noise single-side-band power spectrum density with the frequency offset being increased is, the lower density of the time domain and/or frequency domain resources of the phase-tracking reference signal is required.

It is noted, for the first and second density threshold ranges, an upper limit may be set to a density to which consecutive resources in the time domain and less than 10% of resources in frequency domain correspond.

When the MCS is in a first preset range, the density of the time domain and/or frequency domain resources for the phase-tracking reference signal is configured to be in the first density threshold range; and when the MCS is in a second preset range, the density of the time domain and/or frequency domain resources for the phase-tracking reference signal is configured to be in the second density threshold range; wherein values in the first preset range are less than values in the second preset range and values in the first density threshold range are less than values in the second density threshold range. Preset subsets that may or may not overlap with each other are included in the first preset range or in the second preset range.

In other word, there is a relationship between the MCS and configuration of the time domain and/or frequency domain resources for the phase-tracking reference signal: a lower MCS entails a lower density of the time domain and/or frequency domain resources for the phase-tracking reference signal; and a higher MCS entails a higher density of the time domain and/or frequency domain resources for the phase-tracking reference signal.

Further, there is a relationship between the sub-carrier interval and configuration of the time domain and/or frequency domain resources for the phase-tracking reference signal: when the sub-carrier interval is in a third preset range, the density of the time domain and/or frequency domain resources for the phase-tracking reference signal is configured to be in the first density threshold range; and when the sub-carrier interval is in a fourth preset range, the density of the time domain and/or frequency domain resources for the phase-tracking reference signal is configured to be in the second density threshold range; wherein values in the third preset range are greater than values in the fourth preset range. The third preset range or the fourth preset range may respectively include at least one preset range subset, a detailed description thereof is omitted herein.

In specific, the greater the sub-carrier interval is, the lower density of the time domain and/or frequency domain resources of the phase-tracking reference signal is required; and the lesser the sub-carrier interval is, the higher density of the time domain and/or frequency domain resources of the phase-tracking reference signal is required. It is understood that a mapping table may be pre-established between various sub-carrier intervals and corresponding densities of time domain and/or frequency domain resources. An underlying rule existing in the mapping table may be: the greater the sub-carrier interval is, the lower density of the time domain and/or frequency domain resources for the phase-tracking reference signal is required; and the lesser the sub-carrier interval is, the higher density of the time domain and/or frequency domain resources for the phase-tracking reference signal is required; or, classes of sub-carrier intervals may be preset, and if the sub-carrier interval falls within a first class, it is determined to configure the density of the time domain and/or frequency domain resources by using a first density, and so forth; wherein density values for respective classes are different from each other.

There is a relationship between the amount of time domain and/or frequency domain resource blocks to be scheduled and configuration of the time domain and/or frequency domain resources of the phase-tracking reference signal: based on the amount of time domain and/or frequency domain resource blocks to be scheduled, an allocable upper limit value and an allocable lower limit value for the time domain and/or frequency domain resources of the phase-tracking reference signal are configured. In other words, it is unnecessary for the time domain and/or frequency domain resources of the phase-tracking reference signal to increase in proportion to an increase of RBs to be scheduled; instead a maximum configurable upper limit value and a minimum configurable lower limit value are provided for a quantity of time domain and/or frequency domain resources to be configured.

When the communication waveform is a single-carrier waveform, the density of the time domain and/or frequency domain resources is configured to be a first density; when the communication waveform is an Orthogonal Frequency Division Multiplexing (OFDM) waveform, the density of the time domain and/or frequency domain resources is configured to be a second density; wherein the first density is less than the second density. Determination of the density of the time domain and/or frequency domain resources of the phase-tracking reference signal based on the communication waveform may be understood as: according to a relationship between the waveform and configuration of the time domain and/or frequency domain resources of the phase-tracking reference signal, a density of the time domain and/or frequency domain resources required by a system based on the single-carrier waveform is less than that required by a system based on the OFDM waveform.

After a pattern configuration of the time domain and/or frequency domain resources of the phase-tracking reference signal is completed, information about the pattern configuration may be transmitted to the receiving end via an explicit or implicit signaling indication.

First, a process of transmitting the information about the pattern configuration to the receiving end via the explicit signaling indication is described.

After a pattern of the time domain and/or frequency domain resources of the phase-tracking reference signal is obtained, the method further includes: transmitting the pattern of the time domain and/or frequency domain resources of the phase-tracking reference signal to the receiving end via at least one of Downlink Control Information (DCI), Radio Resource Control (RRC), and a Uplink (UL) grant; or transmitting the pattern of the time domain and/or frequency domain resources of the phase-tracking reference signal to the receiving end via Uplink Control Information (UCI) or the like.

That is, when a base station performs the configuration and a result of the configuration is to be received by a terminal, the result is transmitted to the terminal via a downlink signaling. Specifically, the result is transmitted to the terminal via a signaling indication including at least one of the DCI, the RRC, and the UL grant.

When a terminal performs the configuration and a result of the configuration is to be received by a base station, the result is transmitted to the base station via a uplink signaling. Specifically, the result is transmitted to the base station via a signaling indication including the UCI or the like.

Next, a process of transmitting the information about the pattern configuration to the receiving end via the implicit signaling indication is described.

Indication information indicating that at least one type of reference information is associated with a configuration of time domain and/or frequency domain resources of the phase-tracking reference signal is transmitted to the receiving end via at least one of the DCI, the RRC or the UL grant. Optionally, the indication information indicating that at least one type of reference information is associated with the configuration of time domain and/or frequency domain resources of the phase-tracking reference signal is transmitted to the receiving end via the UCI or the like.

Specifically, in a case that the base station informs the terminal of the information about the configuration, the terminal is informed, in a downlink direction via the signaling indication including at least one of the DCI, the RRC and the UL grant, of indication information indicating that the configuration of time domain and/or frequency domain resources of the phase-tracking reference signal is associated with the phase noise model or with the MCS or with the sub-carrier interval or with the RBs to be scheduled or with the waveform; the terminal derives the configuration of the time domain and/or frequency domain resources of the phase-tracking reference signal based on the indication information by means of searching a look-up table, etc.

In a case that the terminal informs the base station of the information about the configuration, the base station is informed, in a uplink direction via the signaling indication including the UCI, of indication information indicating that the configuration of the time domain and/or frequency domain resources of the phase-tracking reference signal is associated with the phase noise model or with the MCS or with the sub-carrier interval or with the RBs to be scheduled or with the waveform; the base station derives the configuration of the time domain and/or frequency domain resources of the phase-tracking reference signal based on the indication information by means of searching a look-up table, etc.

After the pattern of the time domain and/or frequency domain resources of the phase-tracking reference signal is obtained, the method further includes: determining whether at least one type of reference signal is configured at a resource location corresponding to the pattern of the time domain and/or frequency domain resources or not, wherein the at least one type of reference signal is a reference signal different from the phase-tracking reference signal; in a case that the at least one type of reference signal is configured at the resource location corresponding to the pattern of the time domain and/or frequency domain resources, multiplexing the phase-tracking reference signal with the configured at least one type of reference signal.

In the embodiment, the reference signal different from the phase-tracking reference signal includes known uplink and downlink signals used for functions such as channel estimation, channel measurement or synchronization, e.g., a Demodulation Reference Signal (DMRS), a Channel State Information Reference Signal (CSI-RS) or a Sounding Reference Signal (SRS), etc. In specific, the phase-tracking reference signal may be multiplexed with known other reference signals adequately. The term "multiplex" herein refers to, if the known other reference signals have occupied corresponding time domain and/or frequency domain resources, it is unnecessary to configure the phase-tracking reference signal. The known other reference signal is adapted for functions such as the channel estimation, the channel measurement or the synchronization, the detailed description of transmitted information of the other reference signal is omitted herein.

Further, the method further includes: in a case that the at least one type of reference signal is configured at the resource location corresponding to the pattern of the time domain and/or frequency domain resources, determining whether the at least one type of reference signal occupies all resource locations corresponding to the pattern of the time domain and/or frequency domain resources of the phase-tracking reference signal or not; in a case that at least one time domain and/or frequency domain resource location of the all resource locations is unoccupied, configuring the phase-tracking reference signal at the unoccupied at least one time domain and/or frequency domain resource location.

In other words, a quantity of time domain and/or frequency domain resources required by the phase-tracking reference signal is associated with the phase noise model, the MCS, the sub-carrier interval, the RBs to be scheduled and the waveform. If a quantity of time domain and/or frequency domain resources of other reference signals different from the phase-tracking reference signal is currently insufficient, the unoccupied time domain and/or frequency domain resources should be complemented correspondingly according to the obtained configuration of the phase-tracking reference signal.

It may be seen that the configuration of the time domain and/or frequency domain resources of the phase-tracking signal may be implemented based on the reference information by means of the aforementioned solution, and in this way, the problem that an excessive signal overhead resulting from inflexible configuration of the phase-tracking reference signal is solved, thereby improving a frequency-spectrum efficiency of the phase-tracking reference signal.

Second Embodiment

Figures 1, 2:
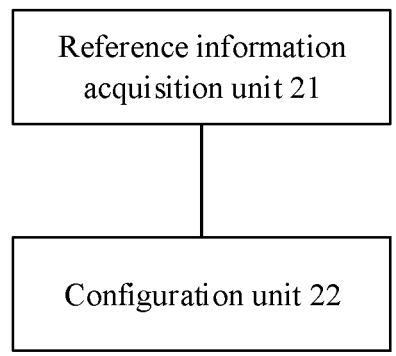
Figure 2:
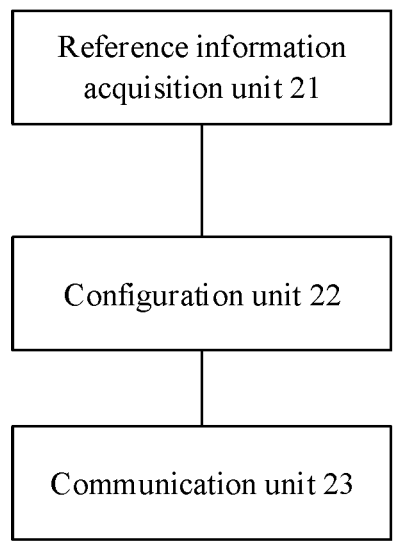

The embodiment of the present disclosure provides a device for configuring a signal. As shown in FIG. 2-1, the device includes a reference information acquisition unit 21 and a configuration unit 22.

The reference information acquisition unit 21 is configured to acquire at least one type of reference information, wherein the reference information is used to characterize a configuration status of a communication network.

The configuration unit 22 is configured to configure time domain and/or frequency domain resources for the phase-tracking reference signal based on the at least one type of reference information, and obtain configuration information of the time domain and/or frequency domain resources for the phase-tracking reference signal, wherein the configuration information includes a density or a pattern corresponding to the time domain and/or frequency domain resources.

Further, it is to be noted that the at least one type of reference information includes at least one of following: a phase-noise single-side-band power spectrum density, a modulation and coding scheme (MCS), a sub-carrier interval, an amount of time domain and/or frequency domain resource blocks to be scheduled, and a communication waveform.

In the embodiment, the phase-noise single-side-band power spectrum density may be obtained by using a phase noise model. It is certainly understood that the phase-noise single-side-band power spectrum density may be obtained by other means, and an exhaustive enumeration of the other means is omitted herein. The phase-noise single-side-band power spectrum density has a profile associated with a cost, a frequency band, a manufacturing process and a power consumption of the local oscillator, and a detailed description thereof is omitted herein.

The MCS refers to modulation and coding schemes, which is used to number various modulation and coding schemes, so that different communication schemes may be employed by the system. For example, a MCS index is used in 802.11 communication systems for configuring a wireless communication data rate to cope with different communication environments.

Correspondingly, the configuration unit is configured to perform at least one of following: based on at least the phase-noise single-side-band power spectrum density corresponding to an increasing frequency offset, configuring the time domain and/or frequency domain resources for the phase-tracking reference signal; based on at least the MCS, configuring the time domain and/or frequency domain resources for the phase-tracking reference signal; based on at least the sub-carrier interval, configuring the time domain and/or frequency domain resources for the phase-tracking reference signal; based on at least the amount of time domain and/or frequency domain resource blocks to be scheduled, configuring the time domain and/or frequency domain resources for the phase-tracking reference signal; based on at least the communication waveform, configuring the time domain and/or frequency domain resources for the phase-tracking reference signal.

Specifically, if a decline rate of the phase-noise single-side-band power spectrum density increases with the frequency offset being increased, a density of the time domain and/or frequency domain resources for the phase-tracking reference signal is configured to be in a first density threshold range; and if the decline rate of the phase-noise single-side-band power spectrum density decreases with the frequency offset being increased, the density of the time domain and/or frequency domain resources for the phase-tracking reference signal is configured to be in a second density threshold range; wherein values in the first density threshold range are less than values in the second density threshold range; density threshold subsets that may or may not overlap with each other are included in the first density threshold range or the second density threshold range.

In other words, there is a relationship between the phase noise model and configuration of the time domain and/or frequency domain resources for the phase-tracking reference signal: the lower the decline rate of the phase-noise single-side-band power spectrum density with the frequency offset being increased is, the higher density of the time domain and/or frequency domain resources for the phase-tracking reference signal is required; and the faster the decline rate of the phase-noise single-side-band power spectrum density with the frequency offset being increased is, the lower density of the time domain and/or frequency domain resources of the phase-tracking reference signal is required.

It is noted, for the first and second density threshold ranges, an upper limit may be set to a density to which consecutive resources in the time domain and less than 10% of resources in frequency domain correspond.

When the MCS is in a first preset range, the density of the time domain and/or frequency domain resources for the phase-tracking reference signal is configured to be in the first density threshold range; and when the MCS is in a second preset range, the density of the time domain and/or frequency domain resources for the phase-tracking reference signal is configured to be in the second density threshold range; wherein values in the first preset range are less than values in the second preset range and values in the first density threshold range are less than values in the second density threshold range. Preset subsets that may or may not overlap with each other are included in the first preset range or in the second preset range.

In other words, there is a relationship between the MCS and configuration of the time domain and/or frequency domain resources for the phase-tracking reference signal: a lower MCS entails a lower density of the time domain and/or frequency domain resources for the phase-tracking reference signal; and a higher MCS entails a higher density of the time domain and/or frequency domain resources for the phase-tracking reference signal.

Further, there is a relationship between the sub-carrier interval and configuration of the time domain and/or frequency domain resources for the phase-tracking reference signal: when the sub-carrier interval is in a third preset range, the density of the time domain and/or frequency domain resources for the phase-tracking reference signal is configured to be in the first density threshold range; and when the sub-carrier interval is in a fourth preset range, the density of the time domain and/or frequency domain resources for the phase-tracking reference signal is configured to be in the second density threshold range; wherein values in the third preset range are greater than values in the fourth preset range. The third preset range or the fourth preset range may respectively include at least one preset range subset, a detailed description thereof is omitted herein.

There is a relationship between the amount of time domain and/or frequency domain resource blocks to be scheduled and configuration of the time domain and/or frequency domain resources of the phase-tracking reference signal: based on the amount of time domain and/or frequency domain resource blocks to be scheduled, an allocable upper limit value and an allocable lower limit value for the time domain and/or frequency domain resources of the phase-tracking reference signal are configured. In other words, it is unnecessary for the time domain and/or frequency domain resources of the phase-tracking reference signal to increase in proportion to an increase of RBs to be scheduled; instead a maximum configurable upper limit value and a minimum configurable lower limit value are provided for a quantity of time domain and/or frequency domain resources to be configured.

When the communication waveform is a single-carrier waveform, the density of the time domain and/or frequency domain resources is configured to be a first density; when the communication waveform is an Orthogonal Frequency Division Multiplexing (OFDM) waveform, the density of the time domain and/or frequency domain resources is configured to be a second density; wherein the first density is less than the second density. Determination of the density of the time domain and/or frequency domain resources of the phase-tracking reference signal based on the communication waveform may be understood as: according to a relationship between the waveform and configuration of the time domain and/or frequency domain resources of the phase-tracking reference signal, a density of the time domain and/or frequency domain resources required by a system based on the single-carrier waveform is less than that required by a system based on the OFDM waveform.

After a pattern configuration of the time domain and/or frequency domain resources of the phase-tracking reference signal is completed, information about the pattern configuration may be transmitted to the receiving end via an explicit or implicit signaling indication.

First, a process of transmitting the information about the pattern configuration to the receiving end via the explicit signaling indication is described.

Based on FIG. 2-1, referring to FIG. 2-2, the device further includes a communication unit 23. The communication unit 23 is configured to: transmit the pattern of the time domain and/or frequency domain resources of the phase-tracking reference signal to the receiving end via at least one of Downlink Control Information (DCI), a Radio Resource Control (RRC) signaling, and a Uplink (UL) grant; or transmit the pattern of the time domain and/or frequency domain resources of the phase-tracking reference signal to the receiving end via Uplink Control Information (UCI) or the like.

That is, when a base station performs the configuration and a result of the configuration is to be received by a terminal, the result is transmitted to the terminal via a downlink signaling. Specifically, the result is transmitted to the terminal via a signaling indication including at least one of the DCI, the RRC signaling, and the UL grant.

When a terminal performs the configuration and a result of the configuration is to be received by a base station, the result is transmitted to the base station via a uplink signaling. Specifically, the result is transmitted to the base station via a signaling indication including the UCI or the like.

Next, a process of transmitting the information about the pattern configuration to the receiving end via the implicit signaling indication is described.

The communication unit 23 is configured to transmit, to the receiving end via at least one of the DCI, the RRC signaling or the UL grant, indication information indicating that at least one type of reference information is associated with a configuration of time domain and/or frequency domain resources of the phase-tracking reference signal. Optionally, the communication unit 23 is configured to transmit, to the receiving end via the UCI or the like, the indication information indicating that at least one type of reference information is associated with the configuration of time domain and/or frequency domain resources of the phase-tracking reference signal.

Specifically, in a case that the base station informs the terminal of the information about the configuration, the terminal is informed, in a downlink direction via the signaling indication including at least one of the DCI, the RRC signaling and the UL grant, of the indication information indicating that the configuration of time domain and/or frequency domain resources of the phase-tracking reference signal is associated with the phase noise model or with the MCS or with the sub-carrier interval or with the RBs to be scheduled or with the waveform; the terminal derives the configuration of the time domain and/or frequency domain resources of the phase-tracking reference signal based on the indication information by means of searching a look-up table, etc.

In a case that the terminal informs the base station of the information about the configuration, the base station is informed, in a uplink direction via the signaling indication including the UCI, of the indication information indicating that the configuration of the time domain and/or frequency domain resources of the phase-tracking reference signal is associated with the phase noise model or with the MCS or with the sub-carrier interval or with the RBs to be scheduled or with the waveform; the base station derives the configuration of the time domain and/or frequency domain resources of the phase-tracking reference signal based on the indication information by means of searching a look-up table, etc.

The configuration unit is further configured to: determine whether at least one type of reference signal is configured at a resource location corresponding to the pattern of the time domain and/or frequency domain resources or not, wherein the at least one type of reference signal is a reference signal different from the phase-tracking reference signal; in a case that the at least one type of reference signal is configured at the resource location corresponding to the pattern of the time domain and/or frequency domain resources, multiplex the phase-tracking reference signal with the configured at least one type of reference signal.

In the embodiment, the reference signal different from the phase-tracking reference signal includes known uplink and downlink signals used for functions such as channel estimation, channel measurement or synchronization, e.g., a Demodulation Reference Signal (DMRS), a Channel State Information Reference Signal (CSI-RS) or a Sounding Reference Signal (SRS), etc. In specific, the phase-tracking reference signal may be multiplexed with known other reference signals adequately.

Further, the configuration unit is further configured to: in a case that the at least one type of reference signal is configured at the resource location corresponding to the pattern of the time domain and/or frequency domain resources, determine whether the at least one type of reference signal occupies all resource locations corresponding to the pattern of the time domain and/or frequency domain resources of the phase-tracking reference signal or not; in a case that at least one time domain and/or frequency domain resource location of the all resource locations is unoccupied, configure the phase-tracking reference signal at the unoccupied at least one time domain and/or frequency domain resource location.

In other words, a quantity of time domain and/or frequency domain resources required by the phase-tracking reference signal is associated with the phase noise model, the MCS, the sub-carrier interval, the RBs to be scheduled and the waveform. If a quantity of time domain and/or frequency domain resources of other reference signals different from the phase-tracking reference signal is currently insufficient, the unoccupied time domain and/or frequency domain resources should be complemented correspondingly according to the obtained configuration of the phase-tracking reference signal.

Figure 3:
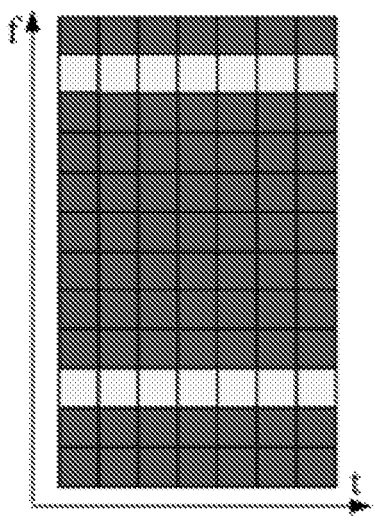
FIG. 3 is a schematic diagram of a resource configuration pattern of a phase-tracking reference signal in the related art.

FIG. 3 illustrates a inflexible configuration pattern of the phase-tracking reference signal in the related art. In FIG. 3, time domain and frequency domain resources corresponding to light-colored blocks denote fixed locations of the time domain and/or frequency domain resources configured for the phase-tracking reference signal. In contrast, with the technical solution provided by the present disclosure, the time domain and/or frequency domain resources are configured for the phase-tracking reference signal in a more flexible manner, so that the problem that the excessive signal overhead resulting from the inflexible configuration for the phase-tracking reference signal is solved, thereby improving the frequency spectrum efficiency of the phase-tracking reference signal.

Third Embodiment

Figure 4:
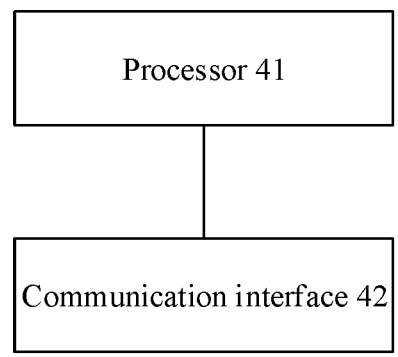
FIG. 4 is a schematic structural diagram of a device for configuring a signal according to the embodiments of the present disclosure.

The embodiment of the present disclosure provides a device for configuring a signal. As shown in FIG. 4, the device for configuring a signal includes a processor 41 and a communication interface 42.

The processor 41 is configured to: acquire at least one type of reference information, wherein the reference information is used to characterize a configuration status of a communication network; configure time domain and/or frequency domain resources for the phase-tracking reference signal based on the at least one type of reference information, and obtain configuration information of the time domain and/or frequency domain resources for the phase-tracking reference signal, wherein the configuration information includes a density or a pattern corresponding to the time domain and/or frequency domain resources.

Further, it is to be noted that the at least one type of reference information includes at least one of following: a phase-noise single-side-band power spectrum density, a modulation and coding scheme (MCS), a sub-carrier interval, an amount of time domain and/or frequency domain resource blocks to be scheduled, and a communication waveform.

In the embodiment, the phase-noise single-side-band power spectrum density may be obtained by using a phase noise model. It is certainly understood that the phase-noise single-side-band power spectrum density may be obtained by other means, and an exhaustive enumeration of the other means is omitted herein. The phase-noise single-side-band power spectrum density has a profile associated with a cost, a frequency band, a manufacturing process and a power consumption of the local oscillator, and a detailed description thereof is omitted herein.

The MCS refers to modulation and coding schemes, which is used to number various modulation and coding schemes, so that different communication schemes may be employed by the system. For example, a MCS index is used in 802.11 communication systems for configuring a wireless communication data rate to cope with different communication environments.

Correspondingly, the processor 41 is configured to perform at least one of following: based on at least the phase-noise single-side-band power spectrum density corresponding to an increasing frequency offset, configuring the time domain and/or frequency domain resources for the phase-tracking reference signal; based on at least the MCS, configuring the time domain and/or frequency domain resources for the phase-tracking reference signal; based on at least the sub-carrier interval, configuring the time domain and/or frequency domain resources for the phase-tracking reference signal; based on at least the amount of time domain and/or frequency domain resource blocks to be scheduled, configuring the time domain and/or frequency domain resources for the phase-tracking reference signal; based on at least the communication waveform, configuring the time domain and/or frequency domain resources for the phase-tracking reference signal.

Specifically, if a decline rate of the phase-noise single-side-band power spectrum density increases with the frequency offset being increased, a density of the time domain and/or frequency domain resources for the phase-tracking reference signal is configured to be in a first density threshold range; and if the decline rate of the phase-noise single-side-band power spectrum density decreases with the frequency offset being increased, the density of the time domain and/or frequency domain resources for the phase-tracking reference signal is configured to be in a second density threshold range; wherein values in the first density threshold range are less than values in the second density threshold range; density threshold subsets that may or may not overlap with each other are included in the first density threshold range or the second density threshold range.

In other words, there is a relationship between the phase noise model and configuration of the time domain and/or frequency domain resources for the phase-tracking reference signal: the lower the decline rate of the phase-noise single-side-band power spectrum density with the frequency offset being increased is, the higher density of the time domain and/or frequency domain resources for the phase-tracking reference signal is required; and the faster the decline rate of the phase-noise single-side-band power spectrum density with the frequency offset being increased is, the lower density of the time domain and/or frequency domain resources of the phase-tracking reference signal is required.

It is noted, for the first and second density threshold ranges, an upper limit may be set to a density to which consecutive resources in the time domain and less than 10% of resources in frequency domain correspond.

When the MCS is in a first preset range, the density of the time domain and/or frequency domain resources for the phase-tracking reference signal is configured to be in the first density threshold range; and when the MCS is in a second preset range, the density of the time domain and/or frequency domain resources for the phase-tracking reference signal is configured to be in the second density threshold range; wherein values in the first preset range are less than values in the second preset range and values in the first density threshold range are less than values in the second density threshold range. Preset subsets that may or may not overlap with each other are included in the first preset range or in the second preset range.

In other words, there is a relationship between the MCS and configuration of the time domain and/or frequency domain resources for the phase-tracking reference signal: a lower MCS entails a lower density of the time domain and/or frequency domain resources for the phase-tracking reference signal; and a higher MCS entails a higher density of the time domain and/or frequency domain resources for the phase-tracking reference signal.

Further, there is a relationship between the sub-carrier interval and configuration of the time domain and/or frequency domain resources for the phase-tracking reference signal: when the sub-carrier interval is in a third preset range, the density of the time domain and/or frequency domain resources for the phase-tracking reference signal is configured to be in the first density threshold range; and when the sub-carrier interval is in a fourth preset range, the density of the time domain and/or frequency domain resources for the phase-tracking reference signal is configured to be in the second density threshold range; wherein values in the third preset range are greater than values in the fourth preset range. The third preset range or the fourth preset range may respectively include at least one preset range subset, a detailed description thereof is omitted herein.

There is a relationship between the amount of time domain and/or frequency domain resource blocks to be scheduled and configuration of the time domain and/or frequency domain resources of the phase-tracking reference signal: based on the amount of time domain and/or frequency domain resource blocks to be scheduled, an allocable upper limit value and an allocable lower limit value for the time domain and/or frequency domain resources of the phase-tracking reference signal are configured. In other words, it is unnecessary for the time domain and/or frequency domain resources of the phase-tracking reference signal to increase in proportion to an increase of RBs to be scheduled; instead a maximum configurable upper limit value and a minimum configurable lower limit value are provided for a quantity of time domain and/or frequency domain resources to be configured.

When the communication waveform is a single-carrier waveform, the density of the time domain and/or frequency domain resources is configured to be a first density; when the communication waveform is an Orthogonal Frequency Division Multiplexing (OFDM) waveform, the density of the time domain and/or frequency domain resources is configured to be a second density; wherein the first density is less than the second density. Determination of the density of the time domain and/or frequency domain resources of the phase-tracking reference signal based on the communication waveform may be understood as: according to a relationship between the waveform and configuration of the time domain and/or frequency domain resources of the phase-tracking reference signal, a density of the time domain and/or frequency domain resources required by a system based on the single-carrier waveform is less than that required by a system based on the OFDM waveform.

After a pattern configuration of the time domain and/or frequency domain resources of the phase-tracking reference signal is completed, information about the pattern configuration may be transmitted to the receiving end via an explicit or implicit signaling indication.

First, a process of transmitting the information about the pattern configuration to the receiving end via the explicit signaling indication is described.

The device further includes the communication interface 42. The communication interface 42 is configured to: transmit the pattern of the time domain and/or frequency domain resources of the phase-tracking reference signal to the receiving end via at least one of Downlink Control Information (DCI), a Radio Resource Control (RRC) signaling, and a Uplink (UL) grant; or transmit the pattern of the time domain and/or frequency domain resources of the phase-tracking reference signal to the receiving end via Uplink Control Information (UCI) or the like.

That is, when a base station performs the configuration and a result of the configuration is to be received by a terminal, the result is transmitted to the terminal via a downlink signaling. Specifically, the result is transmitted to the terminal via a signaling indication including at least one of the DCI, the RRC signaling, and the UL grant.

When a terminal performs the configuration and a result of the configuration is to be received by a base station, the result is transmitted to the base station via a uplink signaling. Specifically, the result is transmitted to the base station via a signaling indication including the UCI or the like.

Next, a process of transmitting the information about the pattern configuration to the receiving end via the implicit signaling indication is described.

The communication interface 42 is configured to transmit, to the receiving end via at least one of the DCI, the RRC signaling or the UL grant, indication information indicating that at least one type of reference information is associated with a configuration of time domain and/or frequency domain resources of the phase-tracking reference signal. Optionally, the communication interface 42 is configured to transmit, to the receiving end via the UCI or the like, the indication information indicating that at least one type of reference information is associated with the configuration of time domain and/or frequency domain resources of the phase-tracking reference signal.

Specifically, in a case that the base station informs the terminal of the information about the configuration, the terminal is informed, in a downlink direction via the signaling indication including at least one of the DCI, the RRC signaling and the UL grant, of the indication information indicating that the configuration of time domain and/or frequency domain resources of the phase-tracking reference signal is associated with the phase noise model or with the MCS or with the sub-carrier interval or with the RBs to be scheduled or with the waveform; the terminal derives the configuration of the time domain and/or frequency domain resources of the phase-tracking reference signal based on the indication information by means of searching a look-up table, etc.

In a case that the terminal informs the base station of the information about the configuration, the base station is informed, in a uplink direction via the signaling indication including the UCI, of the indication information indicating that the configuration of the time domain and/or frequency domain resources of the phase-tracking reference signal is associated with the phase noise model or with the MCS or with the sub-carrier interval or with the RBs to be scheduled or with the waveform; the base station derives the configuration of the time domain and/or frequency domain resources of the phase-tracking reference signal based on the indication information by means of searching a look-up table, etc.

The processor 41 is further configured to: determine whether at least one type of reference signal is configured at a resource location corresponding to the pattern of the time domain and/or frequency domain resources or not, wherein the at least one type of reference signal is a reference signal different from the phase-tracking reference signal; in a case that the at least one type of reference signal is configured at the resource location corresponding to the pattern of the time domain and/or frequency domain resources, multiplex the phase-tracking reference signal with the configured at least one type of reference signal.

In the embodiment, the reference signal different from the phase-tracking reference signal includes known uplink and downlink signals used for functions such as channel estimation, channel measurement or synchronization, e.g., a Demodulation Reference Signal (DMRS), a Channel State Information Reference Signal (CSI-RS) or a Sounding Reference Signal (SRS), etc. In specific, the phase-tracking reference signal may be multiplexed with known other reference signals adequately.

Further, the processor 41 is further configured to: in a case that the at least one type of reference signal is configured at the resource location corresponding to the pattern of the time domain and/or frequency domain resources, determine whether the at least one type of reference signal occupies all resource locations corresponding to the pattern of the time domain and/or frequency domain resources of the phase-tracking reference signal or not; in a case that at least one time domain and/or frequency domain resource location of the all resource locations is unoccupied, configure the phase-tracking reference signal at the unoccupied at least one time domain and/or frequency domain resource location.

In other words, a quantity of time domain and/or frequency domain resources required by the phase-tracking reference signal is associated with the phase noise model, the MCS, the sub-carrier interval, the RBs to be scheduled and the waveform. If a quantity of time domain and/or frequency domain resources of other reference signals different from the phase-tracking reference signal is currently insufficient, the unoccupied time domain and/or frequency domain resources should be complemented correspondingly according to the obtained configuration of the phase-tracking reference signal.

FIG. 3 illustrates the inflexible configuration pattern of the phase-tracking reference signal in the related art. In FIG. 3, time domain and frequency domain resources corresponding to light-colored blocks denote fixed locations of the time domain and/or frequency domain resources configured for the phase-tracking reference signal. In contrast, with the technical solution provided by the present disclosure, the time domain and/or frequency domain resources are configured for the phase-tracking reference signal in a more flexible manner, so that the problem that the excessive signal overhead resulting from the inflexible configuration for the phase-tracking reference signal is solved, thereby improving the frequency spectrum efficiency of the phase-tracking reference signal.

The embodiments of the present disclosure further provide a device for configuring a signal. The device for configuring a signal includes at least one processor, a storage and at least one network interface. The at least one processor, the storage and the at least one network interface are coupled to each other via a bus system. It is understood that the storage in the embodiments of the present disclosure may be a volatile storage or a non-volatile storage, or include both the volatile storage and the non-volatile storage.

In some implementations, the storage stores executable modules or data structures, or subsets thereof, or supersets thereof including operating systems and applications.

In the embodiment, the processor is configured to perform the steps of the method according to the aforementioned first embodiment. A detailed description thereof is omitted herein.

Some embodiments of the present disclosure provide a storage medium. The storage medium stores computer executable instructions, wherein when the computer executable instructions are executed, the steps of the method according to the aforementioned first embodiment are performed.

It is noted that terms "comprise," "include," "have," and any variations thereof in the present disclosure are intended to cover a non-exclusive inclusion meaning, such that a process, a method, an article, or a device that includes a list of elements not only includes the list of elements, but also may include other elements not expressly listed or include elements inherent to the process, the method, the article, or the device. An element preceded by "includes or including" does not preclude existence of additional identical elements in the process, the method, the article, or the device including the element.

The foregoing numbering of the embodiments of the present disclosure is purely for sake of description and does not imply a preference for the embodiments.

From the foregoing description of the embodiments, a person skilled in the art will appreciate clearly that the method according to the embodiments may be implemented not only by software in conjunction with necessary generic hardware platform, but also by hardware, although the former will be preferred in most cases. Based on such a understanding, essential parts, or parts contributing to the related art, of the technical solution of the present disclosure may be implemented in a form of a software product. The software product is stored in a storage medium (e.g., a Read Only Memory (ROM)/Random Access Memory (RAM), a magnetic disk and an optical disc) and includes several instructions adapted to be executed by a terminal device (such as a handset, a computer, an apparatus, an air conditioner or a network device) to perform the method according to the embodiments of the present disclosure.

The above descriptions merely describe optional embodiments of the present disclosure. The scope of the present disclosure is not limited thereto. Any equivalent modification or replacements in structure or process made on a basis of the description and the drawings of the present disclosure, or direct or indirect application thereof in other related technical fields, shall fall within the scope of the present disclosure.

What is claimed is:

1. A method for configuring a signal, comprising:
   acquiring at least one type of reference information, wherein the reference information is used to characterize a configuration status of a communication network; and
   configuring time domain and/or frequency domain resources for a phase-tracking reference signal based on the at least one type of reference information, and obtaining configuration information of the time domain and/or frequency domain resources for the phase-tracking reference signal, wherein the configuration information comprises a density or a pattern corresponding to the time domain and/or frequency domain resources,
   wherein the at least one type of reference information comprises at least one of a phase-noise single-sideband power spectrum density, an amount of time domain and/or frequency domain resource blocks to be scheduled, and a communication waveform;
   wherein the configuring the time domain and/or frequency domain resources for the phase-tracking reference signal based on the at least one type of reference information comprises at least one of the following:
      configuring the time domain and/or frequency domain resources for the phase-tracking reference signal based on at least the phase-noise single-side-band power spectrum density corresponding to an increasing frequency offset;
      configuring the time domain and/or frequency domain resources for the phase-tracking reference signal based on at least the amount of time domain and/or frequency domain resource blocks to be scheduled; and
      configuring the time domain and/or frequency domain resources for the phase-tracking reference signal based on at least the communication waveform;
   wherein based on at least the phase-noise single-side-band power spectrum density corresponding to an increasing frequency offset, configuring the time domain and/or frequency domain resources for the phase-tracking reference signal, further comprises:
      configuring a density of the time domain and/or frequency domain resources for the phase-tracking reference signal to be in a first density threshold range if a decline rate of the phase-noise single-side-band power spectrum density increases with a frequency offset being increased; and
      configuring the density of the time domain and/or frequency domain resources for the phase-tracking reference signal to be in a second density threshold range if the decline rate of the phase-noise single-side-band power spectrum density decreases with the frequency offset being increased; wherein values in the first density threshold range are less than values in the second density threshold range;
   based on at least the amount of time domain and/or frequency domain resource blocks to be scheduled, configuring the time domain and/or frequency domain resources for the phase-tracking reference signal, further comprises:
      configuring an allocable upper limit value and an allocable lower limit value for the time domain and/or frequency domain resources for the phase-tracking reference signal based on the amount of time domain and/or frequency domain resource blocks to be scheduled;
   based on at least the communication waveform, configuring the time domain and/or frequency domain resources for the phase-tracking reference signal, further comprises:
      configuring the density of the time domain and/or frequency domain resources to be a first density in a case that the communication waveform is a single-carrier waveform; and
      configuring the density of the time domain and/or frequency domain resources to be a second density, wherein the first density is less than the second density in a case that the communication waveform is an Orthogonal Frequency Division Multiplexing (OFDM) waveform.

2. The method according to claim 1, wherein, after the obtaining the configuration information of the time domain and/or frequency domain resources for the phase-tracking reference signal, the method further comprises:
   transmitting the configuration information to a receiving end via at least one of a Downlink Control Information (DCI) and an Uplink (UL) grant; and
   transmitting the configuration information to the receiving end via Uplink Control Information (UCI).

3. A device for configuring a signal, comprising:
   a processor, and
   a storage configured to store a computer program executable by the processor, wherein the processor is configured to execute the computer program to implement steps of the method according to claim 2.

4. The method according to claim 1, wherein, after the obtaining the configuration information of the time domain and/or frequency domain resources for the phase-tracking reference signal, the method further comprises:
   transmitting indication information to a receiving end via at least one of a Downlink Control Information (DCI) and an Uplink (UL) grant; wherein the indication information is configured to indicate that a configuration of the time domain and/or frequency domain resources for the phase-tracking reference signal is associated with the at least one type of reference information; or
   transmitting the indication information to the receiving end via Uplink Control Information (UCI); wherein the indication information is configured to indicate that a configuration of the time domain and/or frequency domain resources for the phase-tracking reference signal is associated with the at least one type of reference information.

5. A device for configuring a signal, comprising:
a processor, and
a storage configured to store a computer program executable by the processor, wherein the processor is configured to execute the computer program to implement steps of the method according to claim 4.

6. The method according to claim 1, wherein, after the obtaining the configuration information of the time domain and/or frequency domain resources for the phase-tracking reference signal, the method further comprises:
determining whether at least one type of reference signal is configured at a resource location corresponding to the pattern of the time domain and/or frequency domain resources or not, wherein the at least one type of reference signal is a reference signal different from the phase-tracking reference signal;
in a case that the at least one type of reference signal is configured at the resource location corresponding to the pattern of the time domain and/or frequency domain resources, multiplexing the phase-tracking reference signal with the configured at least one type of reference signal.

7. The method according to claim 1, wherein, after the obtaining the configuration information of the time domain and/or frequency domain resources for the phase-tracking reference signal, the method further comprises:
determining whether at least one type of reference signal is configured at a resource location corresponding to the pattern of the time domain and/or frequency domain resources or not, wherein the at least one type of reference signal is a reference signal different from the phase-tracking reference signal;
in a case that the at least one type of reference signal is configured at the resource location corresponding to the pattern of the time domain and/or frequency domain resources, determining whether the at least one type of reference signal occupies all resource locations corresponding to the pattern of the time domain and/or frequency domain resources of the phase-tracking reference signal or not;
in a case that at least one time domain and/or frequency domain resource location of the all resource locations is unoccupied, configuring the phase-tracking reference signal at the unoccupied at least one time domain and/or frequency domain resource location.

8. A device for configuring a signal, comprising:
a processor, and
a storage configured to store a computer program executable by the processor, wherein the processor is configured to execute the computer program to implement steps of the method according to claim 1.

9. A device for configuring a signal, comprising:
a reference information acquisition circuit, configured to acquire at least one type of reference information, wherein the reference information is used to characterize a configuration status of a communication network; and
a configuration circuit, configured to configure time domain and/or frequency domain resources for a phase-tracking reference signal based on the at least one type of reference information, and obtain configuration information of the time domain and/or frequency domain resources for the phase-tracking reference signal, wherein the configuration information comprises a density or a pattern corresponding to the time domain and/or frequency domain resources,
wherein the at least one type of reference information comprises at least one of a phase-noise single-side-band power spectrum density, an amount of time domain and/or frequency domain resource blocks to be scheduled, and a communication waveform;
wherein the configuration circuit is further configured to perform at least one of the following:
based on at least the phase-noise single-side-band power spectrum density corresponding to an increasing frequency offset, configuring the time domain and/or frequency domain resources for the phase-tracking reference signal;
based on at least the amount of time domain and/or frequency domain resource blocks to be scheduled, configuring the time domain and/or frequency domain resources for the phase-tracking reference signal; and
based on at least the communication waveform, configuring the time domain and/or frequency domain resources for the phase-tracking reference signal;
wherein the configuration circuit is further configured to:
configure a density of the time domain and/or frequency domain resources for the phase-tracking reference signal to be in a first density threshold range if a decline rate of the phase-noise single-side-band power spectrum density increases with a frequency offset being increased; and configure the density of the time domain and/or frequency domain resources for the phase-tracking reference signal to be in a second density threshold range if the decline rate of the phase-noise single-side-band power spectrum density decreases with the frequency offset being increased; wherein values in the first density threshold range are less than values in the second density threshold range;
and/or,
configure an allocable upper limit value and an allocable lower limit value for the time domain and/or frequency domain resources for the phase-tracking reference signal based on the amount of time domain and/or frequency domain resource blocks to be scheduled;
and/or,
configure the density of the time domain and/or frequency domain resources to be a first density in a case that the communication waveform is a single-carrier waveform;
and/or,
configure the density of the time domain and/or frequency domain resources to be a second density, wherein the first density is less than the second density in a case that the communication waveform is an Orthogonal Frequency Division Multiplexing (OFDM) waveform.

10. The device according to claim 9, further comprising,
a communication circuit, configured to transmit the configuration information to a receiving end via at least one of a Downlink Control Information (DCI) and an Uplink (UL) grant; or
transmit the configuration information to the receiving end via an Uplink Control Information (UCI).

11. The device according to claim 9, further comprising:
a communication circuit, configured to transmit indication information to a receiving end via at least one of a Downlink Control Information (DCI) and an Uplink (UL) grant; wherein the indication information is configured to indicate that a configuration of the time domain and/or frequency domain resources for the phase-tracking reference signal is associated with the at least one type of reference information; or transmit the indication information to the receiving end via Uplink Control Information (UCI); wherein the indication information is configured to indicate that a configuration of the time domain and/or frequency domain resources for the phase-tracking reference signal is associated with the at least one type of reference information.

12. The device according to claim 9, wherein the configuration circuit is further configured to:

determine whether at least one type of reference signal is configured at a resource location corresponding to the pattern of the time domain and/or frequency domain resources or not, wherein the at least one type of reference signal is a reference signal different from the phase-tracking reference signal;

in a case that the at least one type of reference signal is configured at the resource location corresponding to the pattern of the time domain and/or frequency domain resources, multiplex the phase-tracking reference signal with the configured at least one type of reference signal.

13. The device according to claim 9, wherein the configuration circuit is further configured to:

determine whether at least one type of reference signal is configured at a resource location corresponding to the pattern of the time domain and/or frequency domain resources or not, wherein the at least one type of reference signal is a reference signal different from the phase-tracking reference signal;

in a case that the at least one type of reference signal is configured at the resource location corresponding to the pattern of the time domain and/or frequency domain resources, determine whether the at least one type of reference signal occupies all resource locations corresponding to the pattern of the time domain and/or frequency domain resources of the phase-tracking reference signal or not;

in a case that at least one time domain and/or frequency domain resource location of the all resource locations is unoccupied, configure the phase-tracking reference signal at the unoccupied at least one time domain and/or frequency domain resource location.

14. A device for configuring a signal, comprising a processor, configured to acquire at least one type of reference information, wherein the reference information is used to characterize a configuration status of a communication network; and configure time domain and/or frequency domain resources for a phase-tracking reference signal based on the at least one type of reference information, and obtain configuration information of the time domain and/or frequency domain resources for the phase-tracking reference signal, wherein the configuration information comprises a density or a pattern corresponding to the time domain and/or frequency domain resources, wherein the at least one type of reference information comprises at least one of a phase-noise single-side-band power spectrum density, an amount of time domain and/or frequency domain resource blocks to be scheduled, and a communication waveform;

wherein the processor is configured to perform at least one of the following:

configuring the time domain and/or frequency domain resources for the phase-tracking reference signal based on at least the phase-noise single-side-band power spectrum density corresponding to an increasing frequency offset;

configuring the time domain and/or frequency domain resources for the phase-tracking reference signal based on at least the amount of time domain and/or frequency domain resource blocks to be scheduled; and configuring the time domain and/or frequency domain resources for the phase-tracking reference signal based on at least the communication waveform;

wherein the processor is further configured to:

configure a density of the time domain and/or frequency domain resources for the phase-tracking reference signal to be in a first density threshold range if a decline rate of the phase-noise single-side-band power spectrum density increases with a frequency offset being increased; and configure the density of the time domain and/or frequency domain resources for the phase-tracking reference signal to be in a second density threshold range if the decline rate of the phase-noise single-side-band power spectrum density decreases with the frequency offset being increased; wherein values in the first density threshold range are less than values in the second density threshold range;

and/or, configure an allocable upper limit value and an allocable lower limit value for the time domain and/or frequency domain resources for the phase-tracking reference signal based on the amount of time domain and/or frequency domain resource blocks to be scheduled;

and/or, configuring the density of the time domain and/or frequency domain resources to be a first density in a case that the communication waveform is a single-carrier waveform; configuring the density of the time domain and/or frequency domain resources to be a second density, wherein the first density is less than the second density in a case that the communication waveform is an Orthogonal Frequency Division Multiplexing (OFDM) waveform.

* * * * *